(12) United States Patent
Mihara et al.

(10) Patent No.: US 7,429,434 B2
(45) Date of Patent: Sep. 30, 2008

(54) CATHODE ACTIVE MATERIAL POWDER FOR LITHIUM SECONDARY BATTERY

(75) Inventors: Takuya Mihara, Chigasaki (JP); Yukimitsu Wakasugi, Chigasaki (JP); Naoshi Saito, Chigasaki (JP); Manabu Suhara, Chigasaki (JP)

(73) Assignee: Seimi Chemical Co., Ltd., Chigasaki-shi (JP)

( * ) Notice: Subject to any disclaimer, the term of this patent is extended or adjusted under 35 U.S.C. 154(b) by 0 days.

(21) Appl. No.: 11/610,529

(22) Filed: Dec. 14, 2006

(65) Prior Publication Data

US 2007/0099087 A1    May 3, 2007

Related U.S. Application Data

(63) Continuation of application No. PCT/JP2005/010819, filed on Jun. 13, 2005.

(30) Foreign Application Priority Data

Jun. 16, 2004 (JP) ............... 2004-177884
Jul. 13, 2004 (JP) ............... 2004-206551

(51) Int. Cl.
   *H01M 4/50* (2006.01)
   *H01M 4/52* (2006.01)
   *H01M 4/58* (2006.01)

(52) U.S. Cl. .............. 429/231.1; 429/223; 429/224; 429/231.95; 252/182.1

(58) Field of Classification Search ............ 429/223, 429/224, 231.1, 231.3, 231.95; 252/182.1
   See application file for complete search history.

(56) References Cited

U.S. PATENT DOCUMENTS

| | | | |
|---|---|---|---|
| 6,551,746 B1 * | 4/2003 | Vitins et al. | 429/231.1 |
| 6,569,569 B1 * | 5/2003 | Kweon et al. | 429/231.1 |
| 6,737,195 B2 * | 5/2004 | Kweon et al. | 429/223 |
| 6,884,543 B2 * | 4/2005 | Tsujimoto et al. | 429/223 |
| 6,921,609 B2 * | 7/2005 | Lampe-Onnerud et al. | 429/223 |
| 2004/0062995 A1 | 4/2004 | Yanagida et al. | 429/331 |

FOREIGN PATENT DOCUMENTS

| | | |
|---|---|---|
| JP | 2001-80920 | 3/2001 |
| JP | 2004-31165 | 1/2004 |
| JP | 2004-146363 | 5/2004 |
| JP | 2004-220897 | 8/2004 |
| WO | WO 2004/082046 A1 | 9/2004 |

OTHER PUBLICATIONS

U.S. Appl. No. 12/100,567, filed Apr. 10, 2008, Wakasugi et al.
U.S. Appl. No. 11/610,529, filed Dec. 14, 2006, Mihara et al.

* cited by examiner

*Primary Examiner*—Stephen J. Kalafut
(74) *Attorney, Agent, or Firm*—Oblon, Spivak, McClelland, Maier & Neustadt, P.C.

(57) ABSTRACT

It is to provide a cathode active material powder for a positive electrode for a lithium secondary battery, which has a large volume capacity density, high safety and excellent durability for charge and discharge cycles. A cathode active material powder for a lithium secondary battery characterized by comprising a first composite oxide powder represented by the formula (1) $Li_pQ_xM_yO_zF_a$ (wherein Q is Co or Mn, M is aluminum or an alkaline earth metal element or a transition metal element other than Q, provided that when Q is Co, $0.9 \leq p \leq 1.1$, $0.980 \leq x \leq 1.000$, $0 \leq y \leq 0.02$, $1.9 \leq z \leq 2.1$, $x+y=1$, and $0 \leq a \leq 0.02$, and when Q is Mn, $1 \leq p \leq 1.3$, $x=2-y$, $0 \leq y \leq 0.05$, $z=4$, and $a=0$), having an average particle size D50 of from 5 to 30 µm, and having a compression breaking strength of at least 40 MPa; and a second composite oxide powder represented by the formula (2) $Li_pNi_xCo_yMn_zN_qO_rF_a$ (wherein N is aluminum or an alkaline earth metal element or a transition metal element other than Ni, Co and Mn, $0.9 \leq p \leq 1.1$, $0.2 \leq x \leq 0.8$, $0 \leq y \leq 0.4$, $0 \leq z \leq 0.5$, $0 \leq q \leq 0.05$, $1.9 \leq r \leq 2.1$, $x+y+z+q=1$, and $0 \leq a \leq 0.02$), having an average particle size D50 of from 2 to 30 µm, and having a compression breaking strength less than 40 MPa; in a ratio (weight ratio) of the first composite oxide powder/the second composite oxide powder being from 95/5 to 30/70.

15 Claims, No Drawings

CATHODE ACTIVE MATERIAL POWDER FOR LITHIUM SECONDARY BATTERY

BACKGROUND OF THE INVENTION

1. Field of the Invention

The present invention relates to a cathode active material powder for a lithium secondary battery, which has a large volume capacity density, high safety, excellent durability for charge and discharge cycles, high rate discharge properties and low temperature characteristics.

2. Discussion of Background

Recently, as the portability and cordless tendency of instruments have progressed, a demand for a non-aqueous electrolyte secondary battery such as a lithium secondary battery which is small in size and light in weight and has a high energy density, has been increasingly high. As a cathode active material for the non-aqueous electrolyte secondary battery, a composite oxide of lithium and a transition metal such as $LiCoO_2$, $LiNiO_2$, $LiNi_{0.8}Co_{0.2}O_2$, $LiMn_2O_4$ or $LiMnO_2$, has been known.

Among them, a lithium secondary battery using a lithium-cobalt composite oxide ($LiCoO_2$) as a cathode active material and using a lithium alloy or carbon such as graphite or carbon fiber as a negative electrode, can operate at a high voltage at a level of 4 V, whereby it has been widely used as a battery having a high energy density.

However, $LiCoO_2$ contains scarce cobalt and is thereby expensive, and in the case of the non-aqueous type secondary battery using it as a cathode active material, there has been a problem of deterioration of the cyclic properties, a problem of the weight capacity density or substantial reduction of the discharge capacity at a low temperature. Further, it has been difficult to put a medium-size or large-size non-aqueous type secondary battery employing $LiCoO_2$ into practical use, because of problems in safety particularly heat stability.

On the other hand, as a cathode active material available at a low cost and having high safety, a lithium-manganese composite oxide represented by $LiMn_2O_4$ has been studied, but is significantly inferior in the durability for charge and discharge cycles and the volume energy density to $LiCoO_2$ and is thereby hardly used practically.

In order to solve such problems, JP-A-2002-100357 by the present inventors proposes a mixture of a lithium-nickel-manganese-M composite oxide represented by $Li_xNi_yMn_{1-y-z}M_zO_2$ (wherein $0.9 \leq x \leq 1.2$, $0.40 \leq y \leq 0.60$, $0 \leq z \leq 0.2$, and M is selected from Fe, Co, Cr and Al atoms) and a lithium-cobalt composite oxide having a R-3m rhombohedral structure and represented by $Li_xCoO_2$ (wherein $0.9 \leq x \leq 1.1$) However, although such a cathode active material has improved safety and has high rate charge and discharge properties which are by no means inferior, but one which sufficiently satisfies the volume capacity density has not yet been obtained.

Further, JP-A-2002-100358 proposes a lithium secondary battery provided with a cathode active material layer containing a lithium transition metal composite oxide as the main component, wherein the lithium transition metal composite oxide is a mixture of a lithium-nickel-manganese-M composite oxide represented by $Li_xNi_yMn_{1-y-z}M_zO_2$ (wherein $0.9 \leq x \leq 1.2$, $0.40 \leq y \leq 0.60$, $0 \leq z \leq 0.2$ and M is selected from $Fe^+$, Co, Cr and Al atoms) and a lithium-manganese spinel composite oxide having a Fd3m spinel structure and represented by $Li_pMn_2O_4$ (wherein $1 \leq p \leq 1.3$). However, with such a cathode active material, durability for charge and discharge cycles is improved, but the volume capacity density is unsatisfactory.

Still further, in order to improve the weight capacity density and the cyclic charge-discharge properties of the positive electrode, JP-A-2000-82466 proposes a cathode active material wherein the average particle size of lithium composite oxide particles is from 0.1 to 50 μm, and at least two peaks are present in the particle size distribution. Further, it has been proposed to mix two types of cathode active materials having different average particle sizes to prepare a cathode active material wherein at least two peaks are present in the particle size distribution. In such a proposal, there may be a case where the weight capacity density and the cyclic charge-discharge properties of the positive electrode can be improved, but one satisfying all of the volume capacity density, the safety, the cyclic properties and the weight capacity density of the positive electrode, has not yet been obtained.

Further, JP-A-2001-80920 proposes an agglomerated lithium composite oxide having a compression breaking strength per grain of from 0.1 to 1.0 gf, which is represented by the formula $Li_xNi_{1-y-z}Co_yMe_zO_2$ (wherein Me is a metal atom with an atomic number of at least 11 or a transition metal element other than Ni and Co, $0 \leq x \leq 1.1$, $0 \leq y \leq 0.6$, and $0 \leq z \leq 0.6$) and which is an agglomerated lithium composite oxide formed by agglomeration of a fine powder. However, such a composite oxide, which contains nickel, has a problem that the safety is poor, and the high rate discharge properties are inferior. Besides, with such a small range of compression breaking strength, it is not possible to obtain a lithium composite oxide having adequately satisfactory properties with respect to e.g. the volume capacity density, the safety, the cyclic properties and the high rate discharge properties.

As described above, a lithium secondary battery employing a lithium composite oxide as a cathode active material which fully satisfies the volume capacity density, the safety, the cyclic properties, the high rate discharge properties, etc., has not yet been obtained by prior art.

SUMMARY OF THE INVENTION

It is an object of the present invention to provide a cathode active material powder for a lithium secondary battery, which satisfies such properties that have been difficult to accomplish by such prior art, and a lithium secondary battery employing the cathode active material powder.

The present inventors have conducted extensive studies and as a result, found the following. Namely, a positive electrode for a lithium secondary battery having a high volume capacity density and high safety can be obtained by using a powder mixture containing a first composite oxide powder comprising a lithium-cobalt composite oxide or a lithium-manganese composite oxide having a specific composition and a specific average particles size and having a specific high compression breaking strength, and a second composite oxide powder comprising a lithium-nickel-manganese composite oxide having a specific composition and a specific average particles size and having a specific small compression breaking strength, in a predetermined ratio. It was confirmed that by such a powder mixture, a high volume capacity density of the positive electrode for a lithium secondary battery to be obtained is achieved without impairing other properties required for a positive electrode, such as the cyclic properties of the positive electrode and the high rate discharge properties.

Namely, the present invention provides the following.

1. A cathode active material powder for a lithium secondary battery characterized by comprising a first composite oxide powder represented by the formula (1) $Li_pQ_xM_yO_zF_a$ (wherein Q is Co or Mn, M is aluminum or an alkaline earth metal element or a transition metal element other than Q, provided that when Q is Co, $0.9 \leq p \leq 1.1$, $0.980 \leq x \leq 1.000$, $0 \leq y \leq 0.02$, $1.9 \leq z \leq 2.1$, $x+y=1$, and $0 \leq a \leq 0.02$, and when Q is Mn, $1 \leq p \leq 1.3$, $x=2-y$, $0 \leq y \leq 0.05$, $z=4$, and $a=0$), having an average particle size D50 of from 5 to 30 μm, and having a compression breaking strength of at least 40 MPa; and a second composite oxide powder represented by the formula (2) $Li_pNi_xCo_yMn_zN_qO_rF_a$ (wherein N is aluminum or an alkaline earth metal element or a transition metal element other than Ni, $0.9 \leq p \leq 1.1$, $0.2 \leq x \leq 0.8$, $0 \leq y \leq 0.4$, $0 \leq z \leq 0.5$, $0 \leq q \leq 0.05$, $1.9 \leq r \leq 2.1$, $x+y+z+q=1$, and $0 \leq a \leq 0.02$), having an average particle size D50 of from 2 to 30 μm, and having a compression breaking strength less than 40 MPa; in a ratio (weight ratio) of the first composite oxide powder/the second composite oxide powder being from 95/5 to 30/70.

2. The cathode active material powder for a lithium secondary battery according to the above 1, which comprises the first composite oxide powder of the formula (1) wherein Q is Co and having an average particle size D50 of from 5 to 20μm, and the second composite oxide powder having an average particle size D50 of from 2 to 15 μm.

3. The cathode active material powder for a lithium secondary battery according to the above 1, which comprises the first composite oxide powder of the formula (1) wherein Q is Mn and having an average particle size D50 of from 5 to 30 μm, and the second composite oxide powder having an average particle size D50 of from 2 to 30 μm.

4. The cathode active material powder for a lithium secondary battery according to the above 1, wherein the ratio of the compression breaking strength of the first composite oxide powder/the compression breaking strength of the second composite oxide powder is from 6/4 to 20/1.

5. The cathode active material powder for a lithium secondary battery according to the above 2, wherein the ratio of the compression breaking strength of the first composite oxide powder/the compression breaking strength of the second composite oxide powder is from 6/4 to 20/1.

6. The cathode active material powder for a lithium secondary battery according to the above 3, wherein the ratio of the compression breaking strength of the first composite oxide powder/the compression breaking strength of the second composite oxide powder is from 6/4 to 20/1.

7. The cathode active material powder for a lithium secondary battery according to the above 1, wherein the compression breaking strength of the first composite oxide powder is from 50 to 120 MPa.

8. The cathode active material powder for a lithium secondary battery according to the above 2, wherein the compression breaking strength of the first composite oxide powder is from 50 to 120 MPa.

9. The cathode active material powder for a lithium secondary battery according to the above 3, wherein the compression breaking strength of the first composite oxide powder is from 50 to 120 MPa.

10. The cathode active material powder for a lithium secondary battery according to the above 1, wherein the compression breaking strength of the second composite oxide powder is from 10 to 30 MPa.

11. The cathode active material powder for a lithium secondary battery according to the above 2, wherein the compression breaking strength of the second composite oxide powder is from 10 to 30 MPa.

12. The cathode active material powder for a lithium secondary battery according to the above 3, wherein the compression breaking strength of the second composite oxide powder is from 10 to 30 MPa.

13. A lithium secondary battery employing the cathode active material powder as defined in the above 1.

14. A lithium secondary battery employing the cathode active material powder as defined in the above 2.

15. A lithium secondary battery employing the cathode active material powder as defined in the above 3.

According to the present invention, a lithium transition metal composite oxide powder for a positive electrode for a lithium secondary battery, which has a large volume capacity density, high safety, durability for charge and discharge cycles and excellent high rate discharge properties, can be provided.

The technical concept found by the present invention such that a larger volume capacity density, higher safety and higher charge and discharge performance can be obtained by using the above two types of composite oxide powders differing in the compression breaking strength, is different from the conventional technical concept as disclosed in JP-A-2001-80920 wherein the compression breaking strength of a lithium composite oxide powder for a positive electrode for a lithium secondary battery is controlled within a prescribed range.

Namely, the compression breaking strength of the first composite oxide powder to be used in the present invention is remarkably high as compared with the range disclosed in JP-A-2001-80920 or the like, while the compression breaking strength of the second composite oxide powder is remarkably low as compared with the range disclosed in JP-A-2001-80920. In the present invention, it is not intended to control the compression breaking strength of a single type of a lithium composite oxide powder within a prescribed range as disclosed in JP-A-2001-80920 or the like. In the present invention, properties of a cathode active material for a lithium secondary battery such as a large volume capacity density and high safety, which has not been achieved by JP-A-2001-80920 or the like, are achieved without impairing other properties, by using two types of composite oxide powders differing in the composition, the average particle size, the compression breaking strength and the like.

The reason as to why a cathode active material for a secondary battery having the above excellent properties can be obtained by the present invention is not necessarily clearly understood, but it is considered as follows. When a positive electrode is formed by compacting the composite oxide powder by pressing, in a case where the two types of composite oxide powders differing in the compression breaking strength of the present invention are used, the compression stress energy will be concentrated on the composite oxide powder having a lower compression breaking strength, whereby this composite oxide powder will be broken and ultrafinely pulverized. Such an ultrafinely pulverized powder will be filled up into spaces among the composite oxide powder having a higher compression breaking strength used together and will be packed in a high density thereby leading to a highly packed cathode active material powder as a whole. It is considered that consequently, a positive electrode having a large volume capacity density can be obtained.

Further, the lithium-nickel-manganese composite oxide as the second composite oxide powder to be used in the present invention has high stability and high safety as compared with a lithium-cobalt composite oxide as one type of the first composite oxide powder, and accordingly the cathode active material of the present invention comprising the mixture of them in a predetermined ratio is considered to have increased stability and safety. Further, the lithium-nickel-manganese composite oxide has high durability for charge and discharge cycles and a large discharge capacity per g as compared with a lithium-manganese composite oxide as the other type of the first composite oxide powder, and by the presence of the lithium-nickel-manganese composite oxide, elution of manganese from the manganese spinel is suppressed. Accordingly, the cathode active material of the present invention comprising the mixture of them in a predetermined ratio is considered to have improved durability for charge and discharge cycles, discharge capacity per g and per volume, and safety.

DETAILED DESCRIPTION OF THE PREFERRED EMBODIMENTS

Now, the present invention will be described in detail below.

The first composite oxide powder used in the present invention is represented by the formula (1): $Li_pQ_xM_yO_zF_a$, and Q, M, p, x, y, z and a are as defined above. In a case where Q is Co, the composite oxide powder is a lithium-cobalt composite oxide powder, wherein p, x, y, z and a are preferably such that $0.9 \leq p \leq 1.1$, $0.980 \leq x \leq 1.000$, $0 \leq y \leq 0.02$, $1.9 \leq z \leq 2.1$, $x+y=1$ and $0 \leq a \leq 0.02$. Here, when a is larger than 0, it is a composite oxide having some of its oxygen atoms substituted by fluorine atoms. In such a case, the safety of the obtained cathode active material will be improved. Further, in a case where Q is Mn, it is a lithium-manganese spinel composite oxide powder wherein p, x, y, z and a are preferably such that $1 \leq p \leq 1.3$, $x=2-y$, $0 \leq y \leq 0.05$, $z=4$ and $a=0$, more preferably such that $1.02 \leq p \leq 1.05$, $x=2-y$, $0.005 \leq y \leq 0.03$, $z=4$ and $a=0$.

In the above formula (1), Q is Co or Mn, M is aluminum or an alkaline earth metal or a transition metal element other than Q, and the transition metal element is a transition metal of Group 4, Group 5, Group 6, Group 7, Group 8, Group 9, Group 10 or Group 11 of the Periodic Table. Among them, M is at least one element selected from the group consisting of Fe, Co, Ni, Cr, Mn, Ti, Zr, Hf, V, Nb, Ta, Mg, Ca, Sr, Ba and Al, provided that when Q is Co, M is selected from the above group except for Co, and when Q is Mn, M is selected from the above group except for Mn.

Particularly, from the viewpoint of the volume development properties, the safety, the cyclic durability, etc., Ti, Zr, Hf, Mg or Al is preferred when Q is Co, and Mg or Al is preferred when Q is Mn.

Either in a case where the composite oxide powder of the above formula (1) wherein Q is Co contains the M element and/or F, and in a case where the composite oxide powder of the above formula (1) wherein Q is Mn contains the M element, each element is preferably contained on the surface of the lithium cobalt oxide particles or the lithium manganese oxide particles.

If the above element is contained in the interior of the lithium cobalt oxide particles or the lithium manganese oxide particles, not only the effect of improving the battery characteristics tends to be small, but also the battery characteristics may decrease in some cases. By the presence of these elements to be contained on the surface, the important battery characteristics such as the safety or the cyclic charge-discharge properties can be improved by addition of a small amount without bringing about the reduction of the battery performance. The presence of these elements on the surface can be judged by carrying out a spectroscopic analysis such as a XPS analysis with respect to the positive electrode particles.

In the present invention, the above average particles size means a volume basis average particle size as in a usual case. In the case of a powder having primary particles dispersed, it means the average particles size of the primary particles, and in the case of a powder having primary particles agglomerated to form secondary particles, it means the average particle size of the secondary particles.

The first composite oxide powder represented by the above formula (1) is preferably a powder having many primary particles agglomerated to form secondary particles. The primary particles are not limited, but their average particle size D50 is preferably from 0.5 to 7 μm. Further, the average particle size D50 of secondary particles in the composite oxide powder of the above formula (1) wherein Q is Co, is preferably from 5 to 20 μm, more preferably from 10 to 15 μm. If the average particle size of the secondary particles is smaller than 5 μm, it tends to be difficult to form dense electrode layer. On the other hand, if it is larger than 20 μm, the high rate discharge properties tend to decrease, such being undesirable. Further, the average particle size D50 of secondary particles in the composite oxide powder of the above formula (1) wherein Q is Mn, is preferably from 5 to 30 μm, more preferably from 8 to 20 μm. If the average particle size of the secondary particles is smaller than 5 μm, it tends to be difficult to form a dense electrode layer. On the other hand, if it is larger than 30 μm, the high rate discharge properties tend to decrease, such being undesirable.

Further, the above first composite oxide powder is required to have a compression breaking strength (hereinafter sometimes referred to simply as compression strength) of at least 40 MPa. If the compression strength of the particulate composite oxide is smaller than 40 MPa, it tends to be difficult to form a dense electrode layer, and the above mentioned objects of the present invention can not be accomplished. Particularly, the compression strength is suitably from 70 to 120 MPa.

In the present invention, the compression strength (St) of the composite oxide powder is a value obtained by the formula of HIRAMATSU et al. ("Journal of the Mining and Metallurgical Institute of Japan", vol. 81, Number 32, December 1965, p. 1024-1030) shown by the following mathematical formula 1.

$$St=2.8P/\Pi d^2 \text{ (}d\text{: particle size, }P\text{: load exerted to particle)}$$

The lithium-nickel-cobalt-manganese composite oxide as the second composite oxide powder to be used in the present invention is represented by the formula (2) $Li_pNi_xCo_yMn_zN_qO_rF_a$. In the formula (2), N, p, x, y, z, q, r and a are as defined above. Particularly, p, x, y, z, q, r and a are preferably as follows. $0.98 \leq p \leq 1.05$, $0.25 \leq x \leq 0.60$, $0.10 \leq y \leq 0.35$, $0.10 \leq z \leq 0.42$, $0 \leq q \leq 0.02$, $1.95 \leq r \leq 2.05$, $x+y+z+q=1$, $0 \leq a \leq 0.01$, and $0.94 \leq x/z \leq 1.06$. Here, when a is larger than 0, it is a composite oxide having some of its oxygen atoms substituted by fluorine atoms. In such a case, the safety, the initial charge and discharge efficiency or the initial discharge capacity, of the obtained cathode active material, will be improved. Further, when $0.94 \leq x/z \leq 1.06$, a high capacity or a high cyclic durability can be obtained.

The lithium-nickel-manganese composite oxide powder contains Ni and Mn as essential components. When Ni is contained within the numerical value range of x in the above formula, the discharge capacity will be improved. If x is less than 0.2, the discharge capacity tends to be low. On the other hand, if it exceeds 0.8, the safety will be low, such being undesirable. Further, when Mn is contained within the numerical value range of z in the above formula, the safety will be improved. If z exceeds 0.5, the discharge capacity tends to be low, or the high rate discharge properties tend to be low, such being undesirable.

In the above formula (2), N is aluminum or an alkaline earth metal or a transition metal element other than Ni, Co and Mn. The transition metal element represents a transition metal of Group 4, Group 5, Group 6, Group 7, Group 8, Group 9, Group 10 or Group 11 of the Periodic Table. Among them, N is at least one element selected from the group consisting of Ti, Zr, Hf, V, Nb, Ta, Mg, Ca, Sr, Ba and Al. Among them, Ti, Zr, Hf, Mg or Al is preferred from the viewpoint of the capacity development properties, the safety, the cyclic durability, etc.

In the composite oxide powder of the formula (2), in the same manner as in the case of the above formula (1), in a case where the above N element and/or F is contained, each of the N element and F is preferably present on the surface of the lithium-nickel-manganese composite oxide particles. If it is present in the interior of the particles, not only the effect of improving the battery characteristics tends to be small, but also the battery characteristics may decrease in some cases. By the presence of these elements on the surface of the particles, the important battery characteristics such as the safety or the cyclic charge-discharge properties can be improved by an addition of a small amount without bringing about the reduction of the battery performance. The presence of the N element and F on the surface can be judged by carrying out a spectroscopic analysis such as a XPS analysis with respect to the positive electrode particles.

The second composite oxide powder represented by the formula (2) preferably comprises secondary particles formed by agglomeration of many primary particles. Such primary particles are not particularly limited, but their average particle size D50 is preferably from 0.5 to 7 μm. And, in the case of the first composite oxide powder of the formula (1) wherein Q is Co, the average particle size D50 of secondary particles of the second composite oxide powder is preferably from 2 to 15 μm, more preferably from 5 to 12 μm. If the average particle size of the secondary particles is smaller than 2 μm, it tends to be difficult to form a dense electrode layer. On the other hand, if it is larger than 15 μm, the high rate discharge properties tend to decrease, such being undesirable. Further, in the case of the first composite oxide powder of the formula (1) wherein Q is Mn, the average particle size D50 of secondary particles of the second composite oxide powder is preferably from 2 to 30 μm, more preferably from 5 to 15 μm. If the average particle size D50 of the secondary particles is smaller than 2 μm, it tends to be difficult to form a dense electrode layer. On the other hand, if it is larger than 30 μm, the high rate discharge properties tend to decrease, such being undesirable.

Further, the second composite oxide powder is required to have a compression strength less than 40 MPa. If the compression strength is larger than 40 MPa, it tends to be difficult to form a dense electrode layer even when the second composite oxide powder is mixed with the first composite oxide powder, and the electrode density tends to be low. The compression strength is particularly suitably from 10 to 30 MPa.

The object of the present invention is accomplished when the compression strengths of the two types of composite oxide powders i.e. the first composite oxide powder and the second composite oxide powder, have the numerical values within the above ranges, respectively. Further, the ratio of the compression strength of the first composite oxide powder/the compression strength of the second composite oxide powder is preferably from 6/4 to 20/1, particularly preferably from 70/25 to 150/15. Either in a case where the ratio is smaller than 6/4 and a case where it exceeds 20/1, the effect of improving the packing property in the electrode layer tends to decrease, such being undesirable.

The cathode active material powder of the present invention is obtained by mixing the first composite oxide powder and the second composite oxide powder, and the cathode active material powder of the present invention is required to contain them in a ratio (weight ratio) of the first composite oxide powder/the second composite oxide powder of from 95/5 to 30/70, preferably from 90/10 to 60/40. Either in a case where the ratio is lower than 30/70 and a case where it exceeds 95/5, the effect of improving the packaging property in the electrode layer tends to decrease, such being undesirable.

With respect to the first composite oxide powder of the above formula (1) wherein Q is Co, the half value width of the diffraction peak of (110) plane at $2\theta=66.5 \pm 1°$ as measured by means of powder X-ray diffraction analysis using CuKα rays as a radiation source, is preferably from 0.07 to 0.14°, particularly preferably from 0.08 to 0.12. When the composite oxide powder satisfies such physical properties, effects such as high voltage, high cyclic durability and high safety will be achieved. Further, in the composite oxide, the remaining alkali amount is preferably at most 0.03 wt %, particularly preferably at most 0.01 wt %.

Each of the first composite oxide powder and the second composite oxide powder has a specific surface area of preferably from 0.3 to 1.5 m$^2$/g, particularly preferably from 0.4 to 1.0 m$^2$/g. Further, in the present invention, the press density means the apparent density when the powder mixture of the positive electrode particles is pressed under 0.32 t/cm$^2$.

For production of the lithium-cobalt composite oxide powder and the lithium-manganese spinel composite oxide powder represented by the formula (1) as the first composite oxide powder used in the present invention and the lithium-nickel-manganese composite oxide powder represented by the formula (2) as the second composite oxide powder, a known means may be employed. As a lithium material, lithium carbonate is preferably used. When lithium carbonate is used as the lithium material, the cost will be low as compared, for example, with a case where lithium hydroxide is used, and an inexpensive high performance lithium composite oxide desired in the present invention can easily be obtained, such being preferred. Further, as materials of cobalt, manganese, nickel, the M element, the N element and the like, a hydroxide, an oxide, an oxyhydroxide, a carbonate, an inorganic salt or a fluoride may preferably be selected. As the fluorine source, a metal fluoride, LiF or MgF$_2$ may, for example, be also used. As the manganese material for production of the lithium-manganese spinel composite oxide, an oxide (such as Mn$_2$O$_3$, MnO or MnO$_2$), a hydrate of such an oxide, an oxyhydroxide or the like is more preferred, and a trivalent manganese compound is more preferred. Such manganese materials may be used alone or in combination of two or more of them.

The powder mixture of such materials is subjected to firing treatment in an oxygen-containing atmosphere at from 700 to 1,050° C. for from 5 to 20 hours. The obtained fired product is cooled, then pulverized and classified, to obtain composite oxide particles having a desired average particle size. In such a case, it is possible to control the average particle size and the compression strength of the composite oxide powder to be formed, by selecting the nature of the raw materials, or the conditions such as the firing temperature, firing time, etc.

In a case where a positive electrode of a lithium secondary battery is produced from the powder mixture of the two types of composite oxide powders of the present invention, a binder material and a carbon type electroconductive material such as acetylene black, graphite or Ketjenblack, may be mixed to the powder of such a composite oxide. As such a binder material, polyvinylidene fluoride, polytetrafluoroethylene, polyamide, carboxymethyl cellulose or acrylic resin may, for example, be preferably employed.

In a lithium secondary battery using the composite oxide powder of the present invention as the cathode active material, as the separator, a porous polyethylene or a porous propylene film may be used. Further, as a solvent of the electrolyte solution of the battery, various solvents may be used. However, carbonate esters are preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the carbonate ester may be used alone or by mixing at least two types. Further, it may be used by mixing with another solvent. Further, according to the material of the anode active material, if the chain carbonate ester is used together with the cyclic carbonate ester, there is a case where the discharge properties, the cyclic durability or the charge and discharge efficiency can be improved.

Further, in the lithium secondary battery using the composite oxide powder of the present invention as the cathode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolyte solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. It is preferably added at a concentration of from 0.2 to 2.0 mol/L (liter) to the electrolyte solvent or the polymer electrolyte comprising the lithium salt. If the concentration deviates from this range, ionic conductivity will decrease, and the electrical conductivity of the electrolyte will decrease. More preferably, it is from 0.5 to 1.5 mol/L.

In the lithium battery using the composite oxide powder of the present invention as the cathode active material, as the anode active material, a material which can occlude and discharge lithium ions may be used. The material forming the anode active material is not particularly limited, however, lithium metal, a lithium alloy, a carbon material, an oxide comprising, as a main body, a metal of Group 14 or Group 15 of the Periodic Table, a carbon compound, a silicon carbide compound, a silicone oxide compound, titanium sulfide or a boron carbide compound may, for example, be mentioned. As the carbon material, an organic material which is subjected to thermal decomposition under various thermal decomposition conditions, artificial graphite, natural graphite, soil graphite, exfoliated graphite or flake graphite etc. can be used. Further, as the oxide, a compound comprising tin oxide as a main body can be used. As the negative electrode current collector, a copper foil, a nickel foil etc. can be used. The negative electrode is produced preferably by kneading the active material with an organic solvent to form a slurry, which is coated on the metal foil current collector, dried and pressed.

The shape of the lithium battery using the composite oxide powder of the present invention as the cathode active material is not particularly limited. Sheet, film, folding, winding type cylinder with bottom or button shape etc. is selected according to use.

Now, the present invention will be explained in further detail with reference to Examples. However, the present invention is by no means restricted to such specific Examples.

In the following, Examples 1-1 to 1-4 and 2-1 to 2-4 are Examples of the present invention, and Examples 1-5 to 1-7 and 2-5 to 2-7 are Comparative Examples.

The compression strength of a composite oxide powder was measured by using a micro compression testing machine MCT-W500 manufactured by Shimadzu Corporation. Namely, with respect to optional ten particles having known particles sizes, the measurements were carried out by using a flat indenter having a diameter of 50 μm with a test load of 100 mN at a loading rate of 3.874 mN/sec, whereby the compression strength was obtained in accordance with the abovementioned formula: $St=2.8 \, P/\Pi d^2$ (d: particle size, P: load exerted to particle).

EXAMPLE 1-1

As a cobalt material, a commercially available cobalt oxyhydroxide powder was used. This powder had an average particle size of 12 μm, wherein primary particles having sizes of from 0.3 to 1 μm were agglomerated to form substantially spherical secondary particles. The cobalt oxyhydroxide powder and a lithium carbonate powder having a specific surface area of 1.2 $m^2/g$ were blended in such as a ratio that the fired product would be $LiCoO_2$, and mixed. After these two types of powders were dry mixed, the mixture was fired in the air at 700° C. for 5 hours and at 950° C. for 12 hours. The fired product was crushed to obtain a substantially spherical $LiCoO_2$ powder having dozens to a hundred and several tens of fine particles having particle sizes of from 1 to 5 μm agglomerated.

The particle size distribution of this powder was measured in water as a dispersion medium by using a laser scattering type particle size distribution measuring apparatus and as a result, a substantially spherical $LiCoO_2$ powder (first powder) having an average particles size D50 of 14.0 μm, D10 of 5.1 μm and D90 of 18.3 μm, a specific surface area of 0.45 $m^2/g$ as measured by means of BET method, was obtained. The compression strength of the obtained $LiCoO_2$ powder was 70 MPa.

With respect to the $LiCoO_2$ powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane at $2\theta=66.5\pm1°$ was 0.098°. 10 g of the $LiCoO_2$ powder was dispersed in 100 g of pure water, and after filtration, the remaining alkali amount was obtained by potentiometric titration with 0.1 N HCl and found to be 0.02 wt %.

Separately, into a reactor, an aqueous sulfate solution containing nickel sulfate, cobalt sulfate and manganese sulfate, aqueous ammonia and an aqueous sodium hydroxide solution were, respectively, continuously supplied, with stirring while the atmosphere was maintained to be an air atmosphere, so that the pH of the slurry in the reactor became 10.7, and the temperature became 50° C. The amount of the liquid in the reaction system was adjusted by an overflow system, and the coprecipitation slurry over-flown was subjected to filtration, washing with water and then drying at 70° C. to obtain a nickel-cobalt-manganese complex hydroxide powder.

The obtained hydroxide powder was dispersed in a 6 wt % sodium persulfate aqueous solution containing 3 wt % of sodium hydroxide, followed by stirring at 20° C. for 12 hours to obtain a nickel-cobalt-manganese composite oxyhydroxide powder. A dried composite oxyhydroxide powder had an average particle size of 9.9 μm and a specific surface area of 11 $m^2/g$.

To this composite oxyhydroxide powder, a predetermined amount of a lithium carbonate powder having an average particle size of 20 μm was mixed, followed by firing in the atmosphere at 900° C. for 16 hours, and then by mixing and pulverization to obtain a $Li_{1.05}Ni_{1/3}Co_{1/3}Mn_{1/3}O_2$ powder. This powder had a specific surface area of 0.89 m$^2$/g by a nitrogen adsorption method and a volume average particle size D50 of 10.4 μm. The powder X-ray diffraction spectrum using CuKα-ray was analogous to a rhombohedral system (R-3m). By the SEM observation, the powder particles were found to be ones having many primary particles agglomerated to form secondary particles, and their shapes were substantially spherical or oval. The compression strength of the obtained $Li_{1.05}Ni_{1/3}Co_{1/3}Mn_{1/3}O_2$ powder (second powder) was 24.2 MPa.

The above first powder and the second powder were mixed in a weight ratio of 80:20 to prepare a cathode active material powder of the present invention. This powder had a press density of 3.18 g/cm$^3$.

The cathode active material powder, acetylene black, graphite powder and a PVDF binder were mixed in a solid content weight ratio of 88:3:3:6, and a N-methyl pyrrolidone solvent was added to the mixture and mixed by a ball mill to prepare a coating slurry. This slurry was applied on one side of an aluminum foil current collector with a thickness of 20 μm by a doctor blade, and the solvent was removed by hot air drying, followed by roll pressing to prepare a positive electrode sheet.

Using one piece of sheet which was punched out from the positive electrode sheet as a positive electrode, using a metal lithium foil having a thickness of 500 μm as a negative electrode, using a nickel foil of 20 μm as a negative electrode current collector, using a porous polypropylene having a thickness of 25 μm as separator and using a $LiPF_6$/EC+DEC (1:1) solution (it means a mixed solution of EC and DEC in a mass ratio (1:1) of which the solute is $LiPF_6$, the same applies to solvents as mentioned hereinafter) at a concentration of 1 M as an electrolytic solution, a pair of simplified sealed cell type lithium batteries made of stainless steel were assembled in an argon glove box.

A piece of the battery was charged up to 4.3 V at a load current of 80 mA per 1 g of the cathode active material at 25° C., and discharge down to 2.5 V at a load current of 80 mA per 1 g of the cathode active material, whereby the initial discharge capacity was obtained. Further, from the initial discharge capacity when the battery was discharged down to 2.5 V at a load current of 320 mA per 1 g of the cathode active material and the initial discharge capacity when it was discharged down to 2.5 V at a load current of 80 mA, the high rate capacity retention was obtained. Further, the charge and discharge cyclic test was sequentially carried out 30 times by use of this battery, comprising charging the battery up to 4.3 V at a load current of 80 mA per 1 g of the cathode active material and discharging the battery down to 2.5 V at a load current of 80 mA per 1 g of the cathode active material. As a result, the initial weight capacity density of the positive electrode layer at from 2.5 to 4.3 V at 25° C. was 160 mAh/g active material, and the capacity retention was 97.2% after 30 times of charge and discharge cycle. Further, the high rate capacity retention was 90%.

Further, the other battery was charged for 10 hours at 4.3 V, and then disassembled in the argon glove box. The positive electrode sheet was taken out after charge, and after the positive electrode sheet was washed, it was punched out at a diameter of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged material was 178° C.

EXAMPLE 1-2

A $LiCoO_2$ powder (first powder) comprising substantially spherical secondary particles formed by agglomeration of dozens of primary particles having particle sizes from 2 to 5 μm was prepared in the same manner as in Example 1-1 except that cobalt oxyhydroxide used in Example 1-1 was fired in the air at 600° C. for 4 hours to prepare a tricobalt tetroxide powder, which was used instead of the cobalt oxyhydroxide. The $LiCoO_2$ powder was a $LiCoO_2$ powder having an average particle size D50 of 14.7 μm, D10 of 5.8 μm and D90 of 20.0 μm, and a specific surface area of 0.50 m$^2$/g as measured by BET method. The compression strength of the particles was obtained in a same manner as in Example 1 and found to be 88 MPa.

With respect to the $LiCoO_2$ powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of 2θ=66.5±10 was 0.108°. Further, the remaining alkali amount was 0.02 wt %.

A cathode active material powder was produced in the same manner as in Example 1-1 except that the above $LiCoO_2$ powder was used, and it had a press density of 3.16 g/cm$^3$. Further, a positive electrode layer was produced in the same manner as in Example 1-1 by using this cathode active material powder, and it had an initial weight capacity density at from 2.5 to 4.3 V at 25° C. of 162 mAh/g active material, and a capacity retention of 97.4% after 30 times of charge and discharge cycle. Further, the high rate capacity retention was 91%. Further, the heat generation starting temperature of the 4.3 V charged material was 177° C.

EXAMPLE 1-3

A $LiCo_{0.997}Al_{0.003}O_{1.998}F_{0.002}$ fired product was prepared in the same manner as in Example 1-1 except that when cobalt oxyhydroxide and lithium carbonate were mixed, an aluminum hydroxide powder was further blended so that the atomic ratio of cobalt to aluminum in the fired product would be 0.997 to 0.003 and that a lithium fluoride powder was added in such a ratio that the F content in the fired product would be $LiCo_{0.997}Al_{0.003}O_{1.998}F_{0.002}$. The fired product was crushed to obtain a powder comprising substantially spherical secondary particles formed by agglomeration of primary particles, and the particle size distribution of the obtained powder was measured in water as a dispersion medium by using a laser scattering type particle size distribution measuring apparatus. As a result, a substantially spherical $LiCo_{0.997}Al_{0.003}O_{1.998}F_{0.002}$ powder (first powder) having an average particle size D50 of 12.1 μm, D10 of 4.3 μm and D90 of 18.3 μm and a specific surface area of 0.53 m$^2$/g as measured by means of BET method, was obtained. The compression strength of the powder was 72 MPa.

With respect to the above powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane at 2θ=66.5+1° was 0.100°. Aluminum and fluorine were localized on the surface. The remaining alkali amount was 0.02 wt %.

A cathode active material powder was produced in the same manner as in Example 1-1 except that the above $LiCo_{0.997}Al_{0.003}O_{1.998}F_{0.002}$ powder was used, and it had a press density of 3.18 g/cm$^3$. Further, a positive electrode layer was produced in the same manner as in Example 1-1 by using this cathode active material powder, and it had an initial weight capacity density at from 2.5 to 4.3 V at 25° C. of 163 mAh/g active material and a capacity retention of 99.4% after 30 times of charge and discharge cycle. Further, the high rate capacity retention was 92%. The heat generation starting temperature of the 4.3 V charged material was 178° C.

EXAMPLE 1-4

A $Li_{1.05}Ni_{3/7}Co_{1/7}Mn_{3/7}O_2$ powder (second powder) was prepared in the same manner as in Example 1-1 except that in preparation of the second powder, the mixing ratio of the nickel material, the cobalt material and the manganese material to prepare coprecipitates was changed. This powder had a specific surface area of 0.59 m$^2$/g by a nitrogen adsorption method and a volume average particle size D50 of 10.9 µm. This $Li_{1.05}Ni_{3/7}Co_{1/7}Mn_{3/7}O_2$ powder had a compression strength of 22.5 MPa. The powder X-ray diffraction spectrum using CuKα rays was analogous to a rhombohedral system (R-3m). By the SEM observation, this powder was found to comprise secondary particles formed by agglomeration of many primary particles, and their shapes were substantially spherical or oval.

A cathode active material powder was produced in the same manner as in Example 1-1 except that this $Li_{1.05}Ni_{3/7}Co_{1/7}Mn_{3/7}O_2$ powder was used, and it had a press density of 3.13 g/cm$^3$. Further, a positive electrode layer was produced in the same manner as in Example 1-1 by using this cathode active material powder, and it had an initial weight capacity density at from 2.5 to 4.3 V at 25° C. of 165 mAh/g active material and a capacity retention of 98.8% after 30 times of charge and discharge cycle. Further, the high rate capacity retention was 88%. The heat generation starting temperature of the 4.3 V charged material was 183° C.

EXAMPLE 1-5

Comparative Example

A cathode active material powder was produced in the same manner as in Example 1-1 except that only the first powder was used and no second powder was used, and its press density was measured, and the battery performance was examined. As a result, the press density was 3.00 g/cm$^3$, which was lower than that in Example 1-1. Further, the positive electrode layer had an initial weight capacity density at from 2.5 to 4.3 V at 25° C. of 161 mAh/g active material and a capacity retention of 96.7% after 30 times of charge and discharge cycle. Further, the high rate capacity retention was 94%. The heat generation starting temperature of the 4.3 V charged material was 160° C.

EXAMPLE 1-6

Comparative Example

A cathode active material powder was produced in the same manner as in Example 1-1 except that only the second powder was used and no first powder was used, and its press density was measured, and the battery performance was examined. As a result, the press density was 2.51 g/cm$^3$, which was lower than that in Example 1-1. Further, the positive electrode layer had an initial weight capacity density at from 2.5 to 4.3 V at 25° C. of 160 mAh/g active material and a capacity retention of 97.8% after 30 times of charge and discharge cycle. Further, the high rate capacity retention was 84%. The heat generation starting temperature of the 4.3 V charged material was 220° C.

EXAMPLE 1-7

Comparative Example

A second powder was prepared in the same manner as in Example 1-1 except that the atmosphere in the reactor for preparation of coprecipitates of the materials for the second powder was changed from the air atmosphere to the nitrogen gas atmosphere to prepare a material oxyhydroxide, which was used for preparation of the second powder. The obtained powder had a composition of $L_{1.05}Ni_{1/3}Co_{1/3}Mn_{1/3}O_2$, a specific surface area of 0.59 m$^2$/g by a nitrogen adsorption method, a volume average particle size D50 of 10.9 µm and a compression strength of 86 MPa. Further, the powder X-ray diffraction spectrum using CuKα rays was analogous to a rhombohedral system (R-3m). By the SEM observation, this powder was found to comprise secondary particles formed by agglomeration of many primary particles, and their shapes were substantially spherical or oval.

A cathode active material powder was produced in the same manner as in Example 1-1 except that the second powder was used, and it had a press density of 2.96 g/cm$^3$, which was lower than the press density in Example 1-1. Further, a positive electrode layer was produced in the same manner as in Example 1-1 by using this cathode active material powder, and it had an initial weight capacity density at from 2.5 to 4.3 V at 25° C. of 160 mAh/g active material and a capacity retention of 97.8% after 30 times of charge and discharge cycle. Further, the high rate capacity retention was 87%. The heat generation starting temperature of the 4.3 V charge material was 175° C.

EXAMPLE 2-1

As a manganese material, an electrolytic manganese dioxide powder was used. This powder had an average particle size of 16.7 µm, and comprised substantially spherical secondary agglomerates formed by agglomeration of primary particles having sizes of from 0.3 to 1 µm. This manganese dioxide powder, a lithium carbonate powder having an average particle size of 20 µm and an aluminum hydroxide powder having an average particle size of 0.5 µm were blended and mixed in a ratio such that the fired product would be $Li_{1.03}Mn_{1.97}Al_{0.03}O_4$. After these three types of powders were dry mixed, the mixture was fired in the air at 700° C. for 5 hours and then cooled once, pulverized and mixed, and further fired at 850° C. for 12 hours. The fired produce was crushed to obtain a substantially spherical $Li_{1.03}Mn_{1.97}Al_{0.03}O_4$ powder formed by agglomeration of dozens or a hundred and several tens of fine particles having particle sizes of from 0.5 to 2 µm.

With respect to this powder, an X-ray diffraction spectrum is obtained by using an X-ray diffraction apparatus (RINT 2100 model, manufactured by Rigaku Corporation). Powder X-ray diffraction analysis using CuKα rays showed that the powder had a Fd3m spinel structure.

The particle size distribution of this powder (first powder) was measured in water as a dispersion medium by using a laser scattering type particle size distribution measuring apparatus and as a result, the average particle size D50 was 17.6 µm, and the specific surface area was 0.7 m$^2$/g as measured by means of BET method. Further, the compression strength was 83 MPa.

Separately, into a reactor, an aqueous sulfate solution containing nickel sulfate, cobalt sulfate and manganese sulfate, aqueous ammonia and an aqueous sodium hydroxide solution were, respectively, continuously supplied, with stirring while the atmosphere was maintained to be an air atmosphere, so that the pH of the slurry in the reactor became 10.7, and the temperature became 50° C. The amount of the liquid in the reaction system was adjusted by an overflow system, and the coprecipitation slurry over-flown was subjected to filtration, washing with water and then drying at 80° C. to obtain a nickel-cobalt-manganese complex hydroxide powder.

The obtained hydroxide powder was dispersed in a 6 wt % sodium persulfate aqueous solution containing 3 wt % of sodium hydroxide, followed by stirring at 20° C. for 12 hours to obtain a nickel-cobalt-manganese composite oxyhydroxide powder. A dried composite oxyhydroxide powder had an average particle size of 9.9 μm and a specific surface area of 11 $m^2/g$.

To this composite oxyhydroxide powder, a predetermined amount of a lithium carbonate powder having an average particle size of 20 μm was mixed, followed by firing in the atmosphere at 900° C. for 16 hours, and then by mixing and pulverization to obtain a $Li_{1.05}Ni_{1/3}Co_{1/3}Mn_{1/3}O_2$ powder. This powder had a specific surface area of 0.89 $m^2/g$ by a nitrogen adsorption method and a volume average particle size D50 of 10.4 μm. The powder X-ray diffraction spectrum using CuKα-ray was analogous to a rhombohedral system (R-3m). By the SEM observation, the second powder was found to comprise secondary particles formed by agglomeration of many primary particles, and their shapes were substantially spherical or oval. The compression strength of the obtained powder (second powder) was 24.2 MPa.

The above first powder and the second powder were mixed in a weight ratio of 75:25 to prepare a cathode active material powder of the present invention. This powder had a press density of 2.84 $g/cm^3$.

The cathode active material powder, acetylene black, graphite powder and a PVDF binder were mixed in a solid content weight ratio of 88:3:3:6, and a N-methyl pyrrolidone solvent was added to the mixture and mixed by a ball mill to prepare a coating slurry. This slurry was applied on one side of an aluminum foil current collector with a thickness of 20 μm by a doctor blade, and the solvent was removed by hot air drying, followed by roll pressing to prepare a positive electrode sheet.

Using one piece of sheet which was punched out from the positive electrode sheet as a positive electrode, using a metal lithium foil having a thickness of 500 μm as a negative electrode, using a nickel foil of 20 μm as a negative electrode current collector, using a porous polypropylene having a thickness of 25 μm as separator and using a $LiPF_6$/EC+DEC (1:1) solution (it means a mixed solution of EC and DEC in a mass ratio (1:1) of which the solute is $LiPF_6$, the same applies to solvents as mentioned hereinafter) at a concentration of 1 M as an electrolytic solution, a pair of simplified sealed cell type lithium batteries made of stainless steel were assembled in an argon glove box.

A piece of the battery was charged up to 4.3 V at a load current of 80 mA per 1 g of the cathode active material at 25° C., and discharge down to 3.0 V at a load current of 80 mA per 1 g of the cathode active material, whereby the initial discharge capacity was obtained. Further, from the initial discharge capacity when the battery was discharged down to 3.0 V at a load current of 320 mA per 1 g of the cathode active material and the initial discharge capacity when it was discharged down to 3.0 V at a load current of 80 mA, the high rate capacity retention was obtained. Further, the charge and discharge cyclic test was sequentially carried out 30 times by use of this battery, comprising charging the battery up to 4.3 V at a load current of 80 mA per 1 g of the cathode active material and discharging the battery down to 3.0 V at a load current of 80 mA per 1 g of the cathode active material. As a result, the initial weight capacity density of the positive electrode layer at from 3.0 to 4.3 V at 25° C. was 128 mAh/g active material, and the capacity retention was 98.7% after 30 times of charge and discharge cycle. Further, the high rate capacity retention was 96%.

EXAMPLE 2-2

In the same manner as in Example 2-1 except that the first powder and the second powder were mixed in a weight ratio of 90:10, the battery performance was measured. The powder had a press density of 2.80 $g/cm^3$. Further, the initial weight capacity density of the positive electrode layer at from 3.0 to 4.3 V at 25° C. was 125 mAh/g active material, and the capacity retention was 98.5% after 30 times of charge and discharge cycles. The high rate capacity retention was 97%.

EXAMPLE 2-3

A $L_{1.05}Ni_{1/2}Mn_{1/2}O_2$ powder (second powder) was prepared in the same manner as in Example 2-1 except that no cobalt material was used at the time of preparation of coprecipitates of the materials for preparation of the second powder. The powder had a specific surface area of 0.80 $m^2/g$ by a nitrogen adsorption method and a volume average particle size D50 of 10.7 μm. This powder had a compression strength of 22.9 MPa. Further, the powder X-ray diffraction spectrum using CuKα rays was analogous to a rhombohedral system (R-3m). By the SEM observation, this powder comprised secondary particles formed by agglomeration of many primary particles, and their shapes were substantially spherical or oval.

A cathode active material powder was prepared by using the obtained powder (second powder) and mixing the first powder and the second powder in a ratio of 75 wt % to 25 wt %, and it had a press density of 2.86 $g/cm^3$. Further, in a battery produced in the same manner as in Example 2-1 by using this cathode active material powder, the initial weight capacity density of the mixed positive electrode layer at from 3.0 to 4.3 V at 25° C. was 125 mAh/g active material, and the capacity retention was 98.6% after 30 times of charge and discharge cycles. Further, the high rate capacity retention was 94%.

EXAMPLE 2-4

A $Li_{1.05}Ni_{3/7}Co_{1/7}Mn_{3/7}O_2$ powder (second powder) was prepared in the same manner as in Example 2-1 except that in preparation of the second powder, the mixing ratio of the nickel material, the cobalt material and the manganese material to prepare coprecipitates was changed. This powder had a specific surface area of 0.82 $m^2/g$ by a nitrogen adsorption method and a volume average particle size D50 of 10.9 μm. Further, the compression strength was 22.5 MPa. The powder X-ray diffraction spectrum using CuKα rays was analogous to a rhombohedral system (R-3m). By the SEM observation, this powder was found to comprise secondary particles formed by agglomeration of many primary particles, and their shapes were substantially spherical or oval.

A cathode active material powder was produced in the same manner as in Example 2-1 except that the obtained powder (second powder) was used, and it had a press density of 2.85 g/cm³ Further, in a battery produced in the same manner as in Example 2-1 by using this cathode active material powder, a positive electrode layer had an initial weight capacity density at from 3.0 to 4.3 V at 25° C. of 127 mAh/g active material and a capacity retention of 98.6% after 30 times of charge and discharge cycle. Further, the high rate capacity retention was 97%.

EXAMPLE 2-5

Comparative Example

A cathode active material powder was produced in the same manner as in Example 2-1 except that only the first powder was used and no second powder was used, and its press density was measured, and the battery performance was examined. The press density was 2.62 g/cm³. Further, the positive electrode layer had an initial weight capacity density at from 3.0 to 4.3 V at 25° C. of 121 mAh/g active material and a capacity retention of 96.8% after 30 times of charge and discharge cycle. Further, the high rate capacity retention was 96%. In this Comparative Example, the press density, the initial weight density and the capacity retention after 30 times of charge and discharge cycle were all lower than those of Example 2-1.

EXAMPLE 2-6

Comparative Example

A cathode active material powder was produced in the same manner as in Example 2-1 except that only the second powder was used and no first powder was used, and its press density was measured, and the battery performance was examined. The press density was 2.75 g/cm³. Further, the positive electrode layer had an initial weight capacity density at from 3.0 to 4.3 V at 25° C. of 152 mAh/g active material and a capacity retention of 97.2% after 30 times of charge and discharge cycle. Further, the high rate capacity retention was 93%. In this Comparative Example, the press density, the capacity retention after 30 times of charge and discharge cycle and the high rate capacity retention were all lower than those of Example 2-1.

EXAMPLE 2-7

Comparative Example

A second powder was prepared in the same manner as in Example 2-1 except that the atmosphere in the reactor for preparation of coprecipitates of the materials for the second powder was changed from the air atmosphere to the nitrogen gas atmosphere to prepare a material oxyhydroxide, which was used for preparation of the second powder. The obtained powder had a composition of $Li_{1.05}Ni_{1/3}Co_{1/3}Mn_{1/3}O_2$, a specific surface area of 0.59 m²/g by a nitrogen adsorption method, a volume average particle size D50 of 10.9 μm and a compression strength of 86 MPa. Further, the powder X-ray diffraction spectrum using CuKα rays was analogous to a rhombohedral system (R-3m). By the SEM observation, this powder was found to comprise secondary particles formed by agglomeration of many primary particles, and their shapes were substantially spherical or oval.

A cathode active material powder was produced in the same manner as in Example 2-1 except that the second powder was used, and it had a press density of 2.78 g/cm³, which was lower than the press density in Example 2-1. Further, in a battery produced in the same manner as in Example 2-1 by using this cathode active material powder, a positive electrode layer had an initial weight capacity density at from 3.0 to 4.3 V at 25° C. of 127 mAh/g active material and a capacity retention of 98.2% after 30 times of charge and discharge cycle. Further, the high rate capacity retention was 95%.

The entire disclosures of Japanese Patent Application No. 2004-177884 filed on Jun. 16, 2004 and Japanese Patent Application No. 2004-206551 filed on Jul. 13, 2004 including specifications, claims and summaries are incorporated herein by reference in their entireties.

What is claimed is:

1. A cathode active material powder for a lithium secondary battery characterized by comprising a first composite oxide powder represented by the formula (1) $Li_pQ_xM_yO_zF_a$ (wherein Q is Co or Mn, M is aluminum or an alkaline earth metal element or a transition metal element other than Q, provided that when Q is Co, $0.9 \leq p \leq 1.1$, $0.980 \leq x \leq 1.000$, $0 \leq y \leq 0.02$, $1.9 \leq z \leq 2.1$, $x+y=1$, and $0 \leq a \leq 0.02$, and when Q is Mn, $1.02 < p < 1.05$, $x=2-y$, $y=0.005$, $z=4$, and $a=0$, having an average particle size D50 of from 5 to 30 μm, and having a compression breaking strength of at least 40 MPa; and a second composite oxide powder represented by the formula (2) $Li_pNi_xCo_yMn_zN_qO_rF_a$, wherein N is aluminum or an alkaline earth metal element or a transition metal element other than Ni, Co and Mn, $0.9 \leq p \leq 1.1$, $0.2 \leq x \leq 0.8$, $0 \leq y \leq 0.4$, $0 < z \leq 0.5$, $0 \leq q \leq 0.05$, $1.9 \leq r \leq 2.1$, $x+y+z+q=1$, and $0 \leq a \leq 0.02$, having an average particle size D50 of from 2 to 30 μm, and having a compression breaking strength less than 40 MPa; in a weight ratio of the first composite oxide powder/ the second composite oxide powder being from 95/5 to 30/70.

2. The cathode active material powder for a lithium secondary battery according to claim 1, which comprises the first composite oxide powder of the formula (1) wherein Q is Co and having an average particle size D50 of from 5 to 20 μm, and the second composite oxide powder having an average particle size D50 of from 2 to 15 μm.

3. The cathode active material powder for a lithium secondary battery according to claim 1, which comprises the first composite oxide powder of the formula (1) wherein Q is Mn and having an average particle size D50 of from 5 to 30 μm, and the second composite oxide powder having an average particle size D50 of from 2 to 30 μm.

4. The cathode active material powder for a lithium secondary battery according to claim 1, wherein the ratio of the compression breaking strength of the first composite oxide powder/the compression breaking strength of the second composite oxide powder is from 6/4 to 20/1.

5. The cathode active material powder for a lithium secondary battery according to claim 2, wherein the ratio of the compression breaking strength of the first composite oxide powder/the compression breaking strength of the second composite oxide powder is from 6/4 to 20/1.

6. The cathode active material powder for a lithium secondary battery according to claim 3, wherein the ratio of the compression breaking strength of the first composite oxide powder/the compression breaking strength of the second composite oxide powder is from 6/4 to 20/1.

7. The cathode active material powder for a lithium secondary battery according to claim 1, wherein the compression breaking strength of the first composite oxide powder is from 50 to 120 MPa.

8. The cathode active material powder for a lithium secondary battery according to claim 2, wherein the compression breaking strength of the first composite oxide powder is from 50 to 120 MPa.

9. The cathode active material powder for a lithium secondary battery according to claim 3, wherein the compression breaking strength of the first composite oxide powder is from 50 to 120 MPa.

10. The cathode active material powder for a lithium secondary battery according to claim 1, wherein the compression breaking strength of the second composite oxide powder is from 10 to 30 MPa.

11. The cathode active material powder for a lithium secondary battery according to claim 2, wherein the compression breaking strength of the second composite oxide powder is from 10 to 30 MPa.

12. A cathode active material powder for a lithium secondary battery characterized by comprising a first composite oxide powder represented by the formula (1) $Li_pQ_xM_yO_zF_a$, wherein Q is Mn, M is aluminum or an alkaline earth metal element or a transition metal element other than Q, wherein in formula 1, $1<p<1.3$, $x=2-y$, $0<y<0.05$, $z=4$, and $a=0$, having an average particle size D50 of from 5 to 30 μm, and having a compression breaking strength of at least 40 MPa; and a second composite oxide powder represented by the formula (2) $Li_pNi_xCo_yMn_zN_qO_rF_a$, wherein N is aluminum or an alkaline earth metal element or a transition metal element other than Ni, Co and Mn, $0.9<p<1.1$, $0.2<x<0.8$, $0<y<0.4$, $0<z<0.5$, $0<q<0.05$, $1.9<r<2.1$, $x+y+z+q=1$, and $0<a<0.02$, having an average particle size D50 of from 2 to 30 μm; in a weight ratio of the first composite oxide powder/the second composite oxide powder being from 95/5 to 30/70, wherein the compression breaking strength of the second composite oxide powder is from 10 to 30 MPa.

13. A lithium secondary battery employing the cathode active material powder as defined in claim 1.

14. A lithium secondary battery employing the cathode active material powder as defined in claim 2.

15. A lithium secondary battery employing the cathode active material powder as defined in claim 3.

* * * * *